US010979274B2

(12) United States Patent
Pan et al.

(10) Patent No.: US 10,979,274 B2
(45) Date of Patent: Apr. 13, 2021

(54) EFFICIENT UTILIZATION OF SSBS IN NEW RADIO SYSTEMS

(71) Applicant: Sony Corporation, Tokyo (JP)

(72) Inventors: Kyle Jung-Lin Pan, Melville, NY (US); Fengjun Xi, San Diego, CA (US); Janet A. Stern-Berkowitz, Melville, NY (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/608,186

(22) PCT Filed: Apr. 30, 2018

(86) PCT No.: PCT/US2018/030204
§ 371 (c)(1),
(2) Date: Oct. 25, 2019

(87) PCT Pub. No.: WO2018/204260
PCT Pub. Date: Nov. 8, 2018

(65) Prior Publication Data
US 2020/0067755 A1    Feb. 27, 2020

Related U.S. Application Data

(60) Provisional application No. 62/543,119, filed on Aug. 9, 2017, provisional application No. 62/519,532, filed
(Continued)

(51) Int. Cl.
*H04L 27/26* (2006.01)
(52) U.S. Cl.
CPC ........ *H04L 27/2675* (2013.01); *H04L 27/266* (2013.01); *H04L 27/2659* (2013.01)

(58) Field of Classification Search
CPC .. H04W 56/00; H04J 11/0069; H04J 11/0073; H04J 11/0076
See application file for complete search history.

(56) References Cited

U.S. PATENT DOCUMENTS

2018/0262313 A1* 9/2018 Nam .................. H04L 5/005
2019/0007959 A1* 1/2019 Hwang ............ H04W 72/0446
(Continued)

OTHER PUBLICATIONS

International Search Report and Written Opinion dated Jul. 26, 2018 for PCT/US2018/030204 filed on Apr. 30, 2018, 9 pages.
(Continued)

*Primary Examiner* — Gregory B Sefcheck
*Assistant Examiner* — Debebe A Asefa
(74) *Attorney, Agent, or Firm* — Xsensus LLP

(57) ABSTRACT

Methods and an apparatus for performing synchronization in New Radio (NR) systems are disclosed. A frequency band may be determined and may correspond to a WTRU. On a condition that the operational frequency band is a lower frequency, a synchronization signal block (SSB) index may be implicitly. On a condition that the operational frequency band is a higher frequency, an SSB index may be determined based on a hybrid method which includes determining the SSB index using both an implicit and an explicit method. A configuration of actually transmitted SSBs may be determined using a multi-level two stage compressed indication where SSB groups are determined based on a coarse indicator and actually transmitted SSBs with the SSB groups are determined based on a fine indicator.

12 Claims, 13 Drawing Sheets

Related U.S. Application Data on Jun. 14, 2017, provisional application No. 62/500,901, filed on May 3, 2017.

(56) References Cited

U.S. PATENT DOCUMENTS

2019/0380099 A1* 12/2019 Hakola ................ H04B 7/088
2020/0245228 A1*  7/2020 Rune ................. H04B 7/0871

OTHER PUBLICATIONS

Interdigital Communications, "On Synchronization Signal Block and Indication," 3GPP TSG RAN WG1 Meeting No. 88bis, R1-1705498, Retrieved from the Internet URL: http://www.3gpp.org/ftp/Meetings_3GPP_SYNC/RAN1/Docs/ on Apr. 2, 2017, 5 pages.

Qualcomm Incorporated, "SS block, burst-set composition, and time index indication," 3GPP TSG-RAN WG1 NR No. 88bis, R1-1705565, Retrieved from the Internet URL: http://www.3gpp.org/ftp/Meetings_3GPP_SYNC/RAN1/Docs/ on Apr. 2, 2017, 9 pages.

* cited by examiner

EFFICIENT UTILIZATION OF SSBS IN NEW RADIO SYSTEMS

CROSS REFERENCE TO RELATED APPLICATIONS

This application is based on PCT filing PCT/US2018/030204, filed Apr. 30, 2018, which claims the benefit of U.S. provisional application Nos. 62/500,901, filed May 3, 2017; 62/519,532, filed Jun. 14, 2017; and 62/543,119, filed Aug. 9, 2017, the contents of each are hereby incorporated by reference herein.

BACKGROUND

General requirements set out by ITU-R, NGMN and 3GPP, broadly classify the use cases for emerging 5G systems include Enhanced Mobile Broadband (eMBB), Massive Machine Type Communications (mMTC) and Ultra Reliable and Low latency Communications (URLLC). Different use cases may focus on different requirements such as higher data rate, higher spectrum efficiency, low power and higher energy efficiency, lower latency and higher reliability. A wide range of spectrum bands ranging from 700 MHz to 80 GHz may be considered for a variety of deployment scenarios.

As carrier frequency increases, severe path loss can be experienced and may limit coverage. Transmission in millimeter wave systems may also suffer from non-line-of-sight losses such as diffraction loss, penetration loss, oxygen absorption loss, foliage loss or the like. During initial access, a base station and wireless transmit/receive units (WTRUs) may need to overcome these high path losses and discover each other.

SUMMARY

Methods and an apparatus for performing synchronization in New Radio (NR) systems are disclosed. According to the disclosed subject matter, an operational frequency band may be determined. The frequency band may correspond to a WTRU. On a condition that the operational frequency band is a lower frequency, a synchronization signal block (SSB) index may be implicitly. On a condition that the operational frequency band is a higher frequency, an SSB index may be determined based on a hybrid method which includes determining the SSB index using both an implicit and an explicit method. A configuration of actually transmitted SSBs may be determined using a multi-level two stage compressed indication where SSB groups are determined based on a coarse indicator and actually transmitted SSBs with the SSB groups are determined based on a fine indicator.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
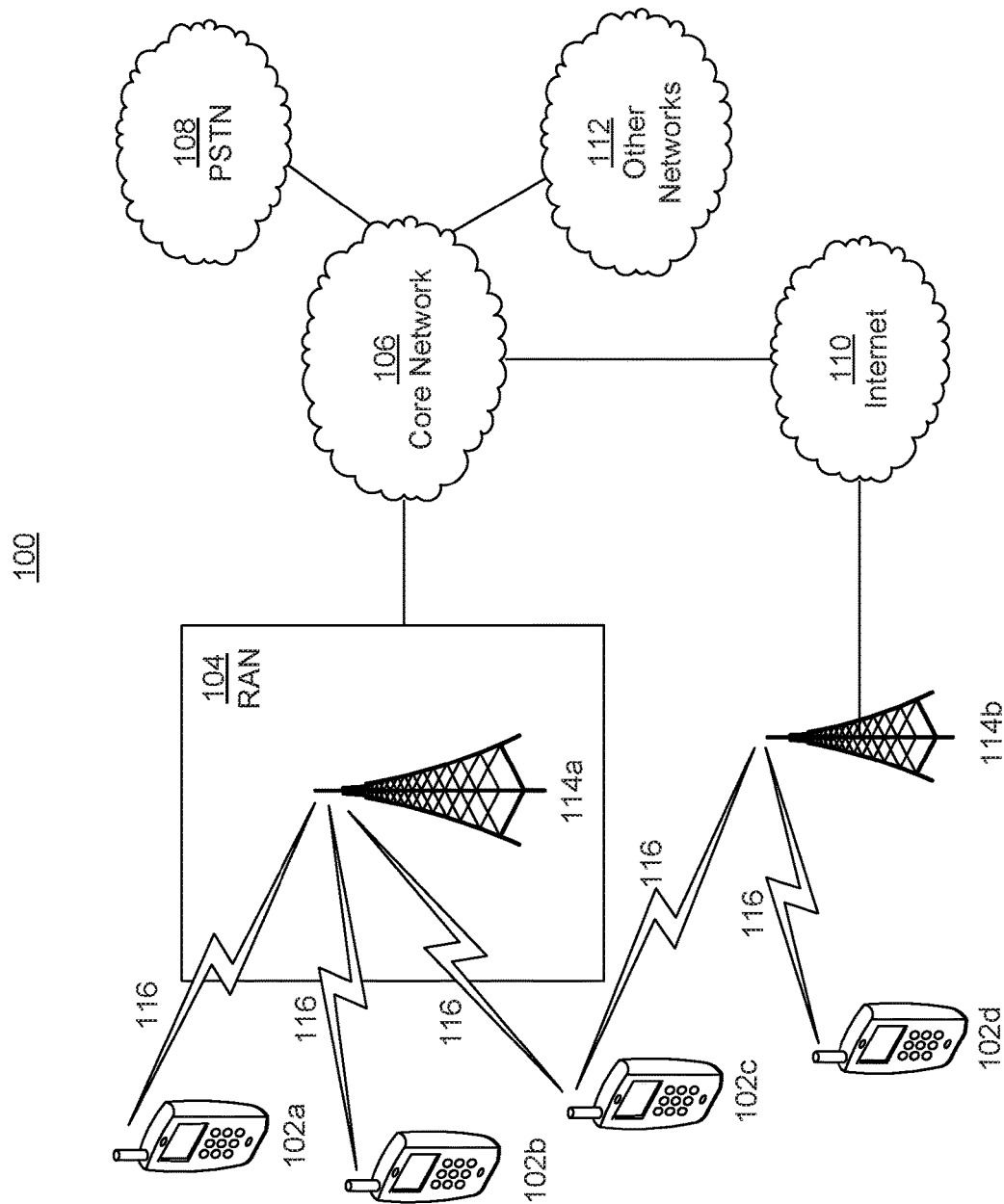
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
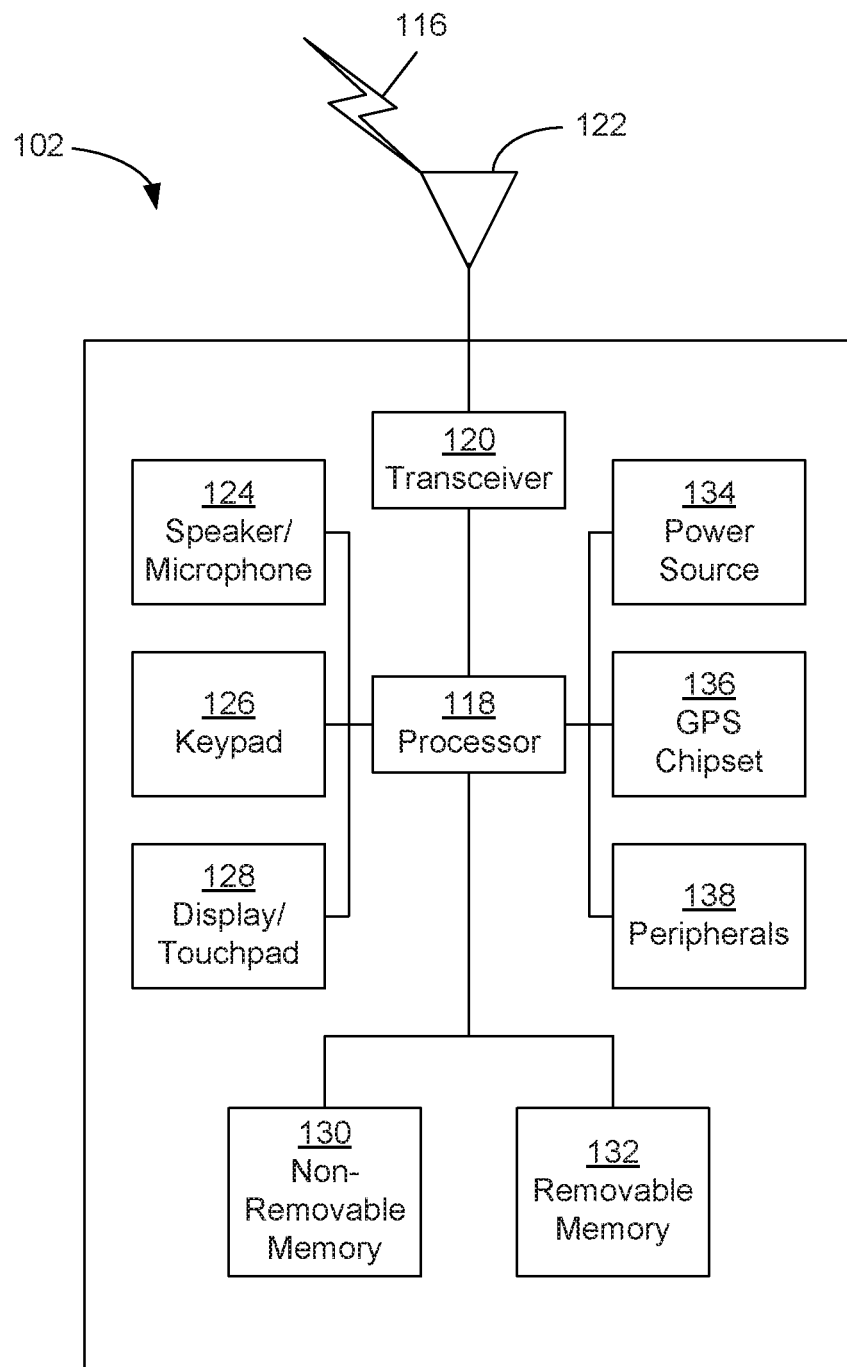
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
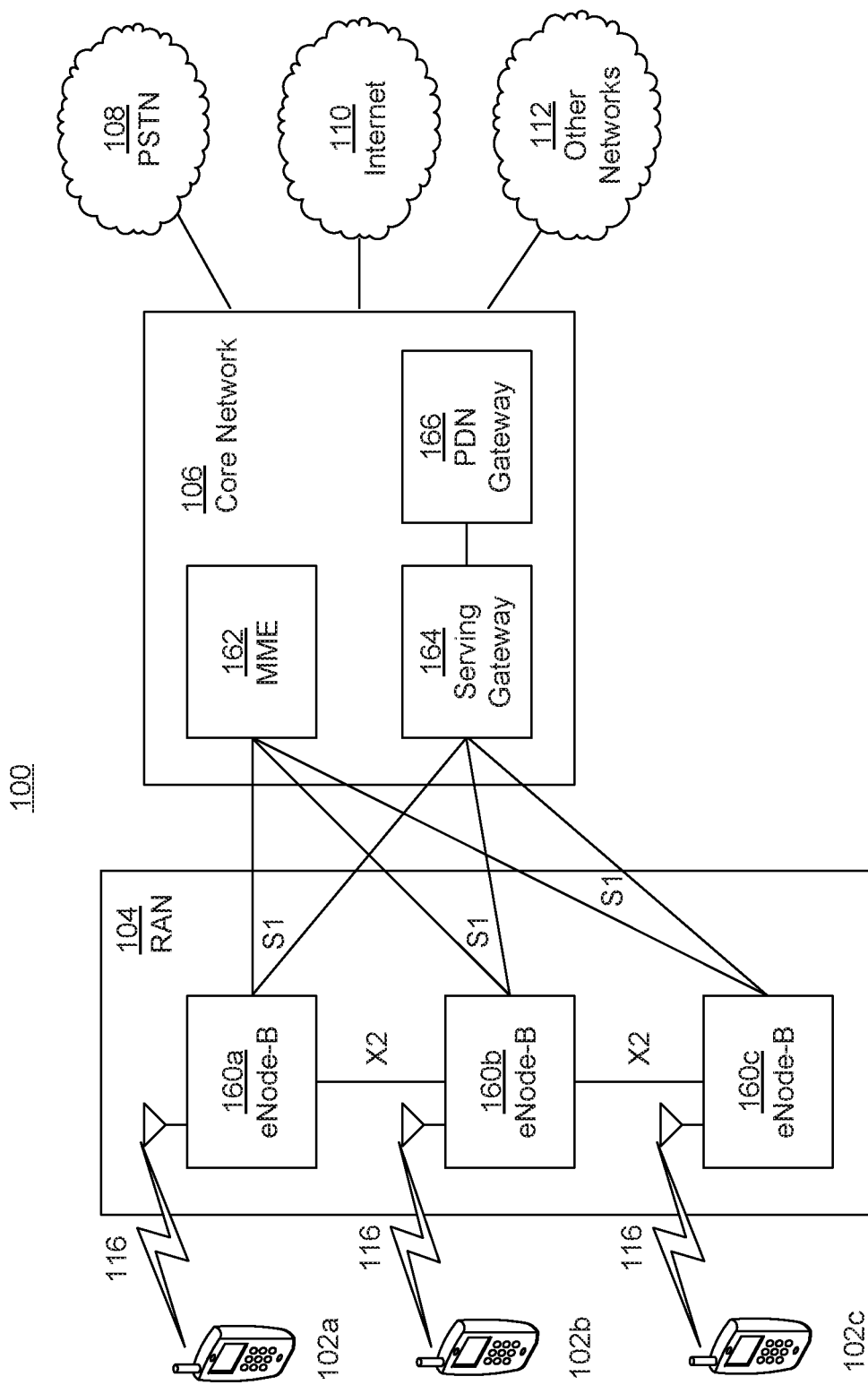
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (MSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
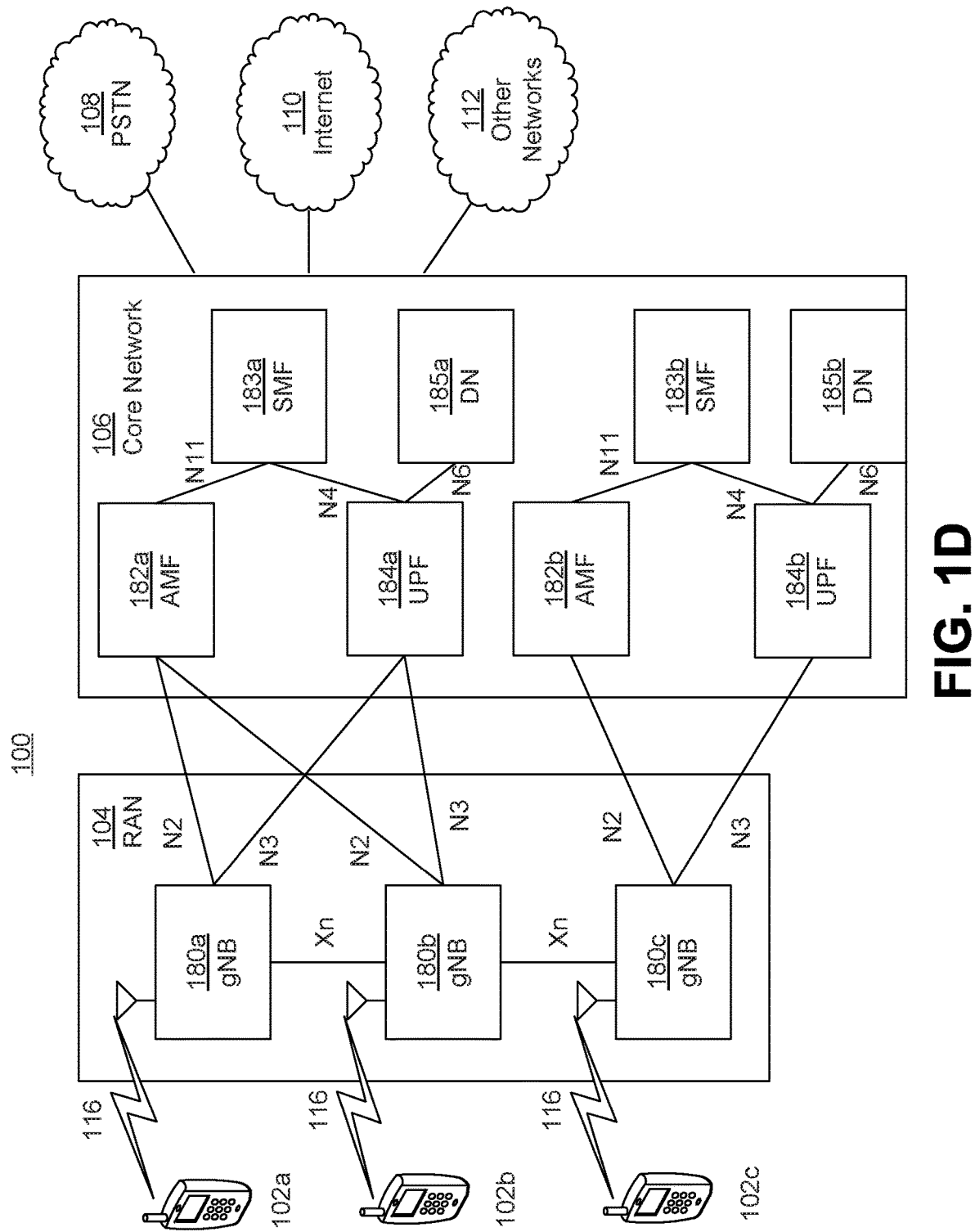
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-ab*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

LTE initial synchronization utilizes a cell search procedure where a WTRU acquires time and frequency synchronization with a cell and detects the Cell ID of that cell. The LTE synchronization signals are transmitted in the $0^{th}$ and $5^{th}$ subframes of every radio frame and are used for time and frequency synchronization during initialization. A WTRU may synchronize sequentially to the OFDM symbol, slot, subframe, half-frame, and radio frame based on the synchronization signals. The two synchronization signals are the Primary Synchronization Signal (PSS) and the Secondary Synchronization Signal (SSS). The PSS may be used to obtain slot, subframe and half-frame boundary. It may also provide physical layer cell identity (PCI) within the cell identity group. The SSS may be used to obtain the radio frame boundary. It also enables the UE to determine the cell identity group, which may range from 0 to 167. Following a successful synchronization and PCI acquisition, the WTRU may decode the Physical Broadcast Channel (PBCH) with the help of cell specific reference signals (CRS) and acquire the master information block (MIB) information regarding system bandwidth, System Frame Number (SFN) and PHICH configuration. LTE synchronization signals and PBCH may be transmitted continuously according to a standardized periodicity.

Figure 2:
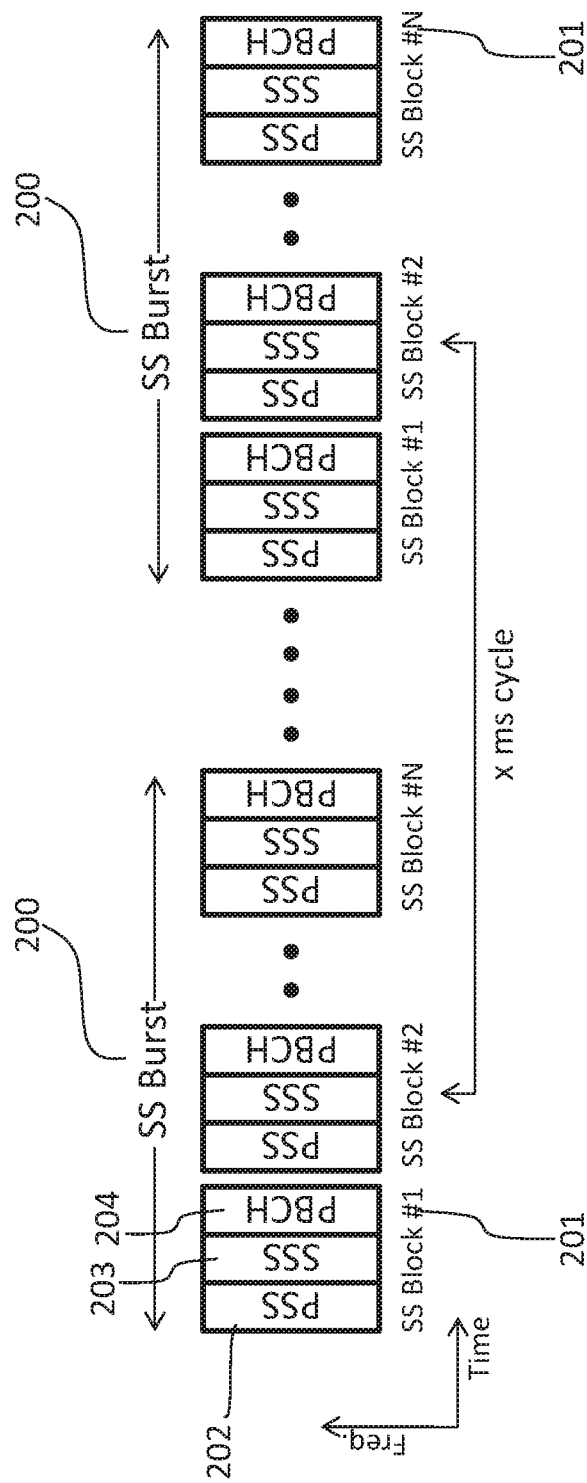
FIG. 2 shows an example of synchronization signal (SS) burst with x ms cycle and multiple SSBs in a SS burst.

In an LTE system, a single beam is used for initial access. In a New Radio (NR) system, a synchronization signal burst (SS burst) may be used when multiple beams are used for initial access and where the SS burst may be transmitted periodically such as, for example, approximately every 20 ms, and each SS burst may include one or more SSB. One or more SSBs in a SS burst may be associated with one or more beams and the number of SSBs in a SS burst may be determined by a gNB based on the number of beams used at the gNB. As an example, if N beams are used at a gNB, N SSBs may be used or transmitted in a SS burst. Each SSB may include a primary synchronization signal (PSS), a secondary synchronization signal (SSS), and a PBCH (physical broadcasting channel). FIG. 2 shows an example of synchronization signal (SS) burst with x ms cycle and multiple SSBs in SS bursts 200. As shown in FIG. 2, each SS burst 200 may include SSBs 201 labled 1 through N which may be cycled every x ms and may each comprise a PSS 202, a SS 203, and a PCBH 204 component. As shown, the X axis indicates time and the Y axis indicated frequency.

In NR systems, synchronization signals (SS) may be used to achieve time synchronization between a gNB and a wireless transmit/receive unit (WTRU). More particularly, a WTRU may need to know the SSB information including a block index time indication to be used to decode such block information and for time synchronization. Further, some SSBs may be used to transmit synchronization signals while other SSBs may not be used to transmit synchronization signals. This may be partly due to antenna and beam configurations at gNB or Tx/RX points (TRP). Accordingly, techniques to obtain SSB index time indication and to reuse or use the unused SSBs are needed. Additionally, used SSBs may serve as reference points for a WTRU to perform more precise measurement. Access to unused SSB information may allow a WTRU to obtain or determine used SSB information. Accordingly, a WTRU may use the known reference timing points for measurement purposes.

In accordance with the subject matter disclosed herein, a WTRU may know SSB information including time indication to acquire time synchronization between gNB/TRP and the WTRU. Further, SSBs may carry an index, which may be used for time indication for a WTRU to acquire time synchronization. The index may be indicated to the WTRU to support more precise measurement as well as to increase system efficiency and throughput. In accordance with the subject matter disclosed herein, the proposed solutions may also be used for acquiring time synchronization or SSB information between devices such as, for example, gNBs, between TRPs and between gNB and TRP.

Figure 3A:
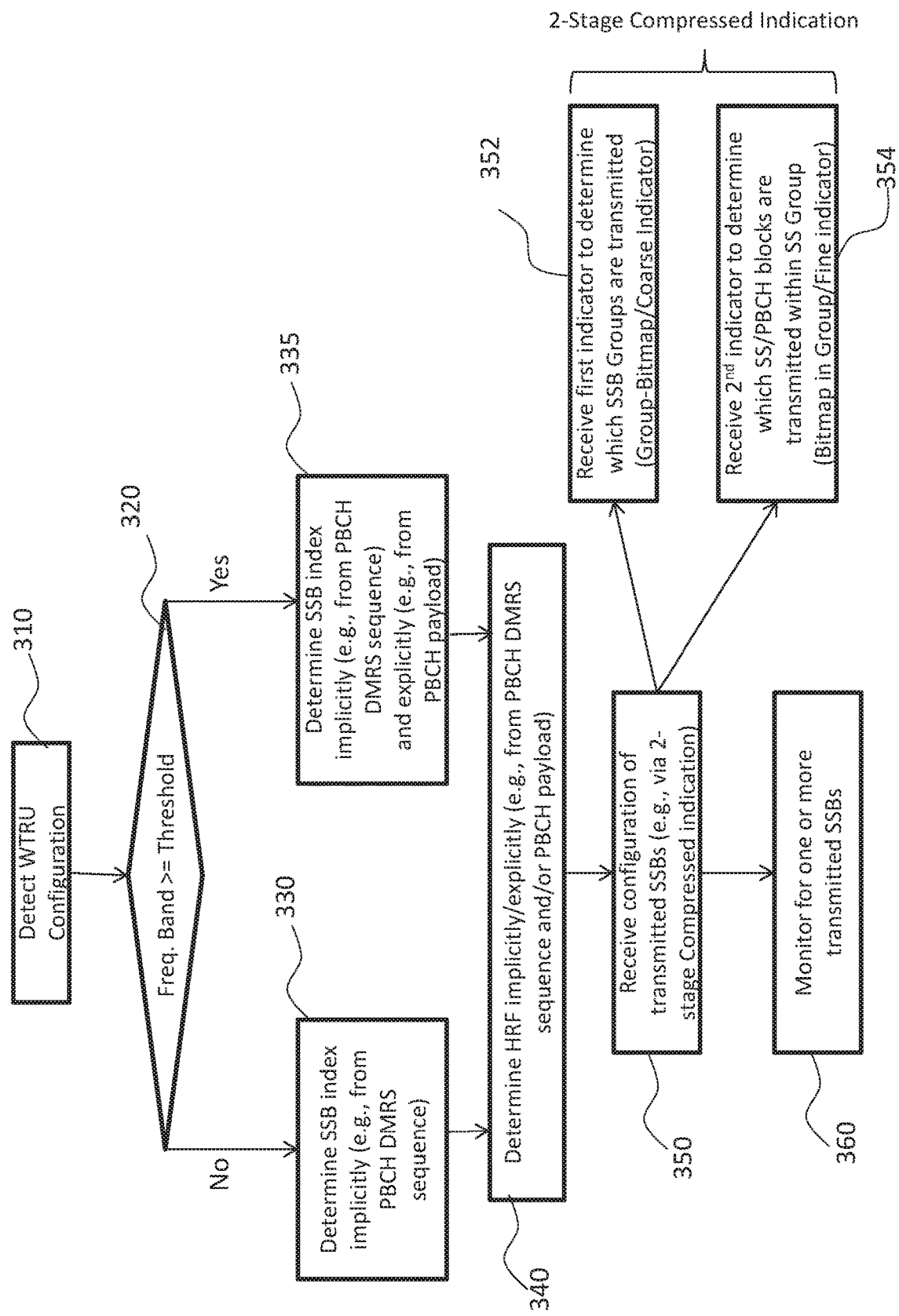
FIG. 3A shows a diagram for determining SS Block (SSB) presence, index, and half radio frame timing.

Efficient techniques for determining SSB presence, SSB index, and half radio frame (HRF) timing are shown in FIG. 3A. These techniques may be employed by any applicable component such as, for example, a processor internal or external to a WTRU. At 310, a WTRU configuration may be detected and, at 320, a determination may be made regarding whether the frequency band associated with the WTRU configuration detected at 310 is equal to, greater than or less than a threshold frequency band. As a non-limiting example, the threshold frequency band may be 6 GHz and a determination regarding whether the frequency band for a detected SSB is greater than (or equal to) or less than 6 GHz may be made at 320.

If the frequency band for an SSB is determined to be below the threshold frequency band, as shown at 330, an SSB index may be determined implicitly from a PBCH demodulation reference signal (DMRS) sequence. Alternatively, if the frequency band for an SSB is determined to be above or equal to a threshold frequency band, as shown at 335, a portion of an SSB index may be determined implicitly from a PBCH DMRS sequence and the rest of the SSB index may be determined explicitly from a PBCH payload. An SSB index determined implicitly may be determined based on the energy levels or correlation levels of a signal such that bits in the SSB index may correspond to energy levels or correlation levels of a signal exceeding an energy or correlation threshold. A correlator may be employed to determine the energy level or correlation level. It will be understood that other techniques or thresholds may be used to detect the bits in an SSB index.

As shown at 340, HRF timing may be determined based on either the implicit SSB index determination of 330 or the partial implicit and partial explicit determination of the SSB index of 335.

At 350, a configuration of transmitted SSBs may be received via any applicable manner such as via a multi-level two stage compressed indication. In a multi-level two stage compressed indication, as shown at 352, the configuration may include a first indicator which may contain information to enable a determination of which SSB groups are transmitted. The first indicator at 352 may be a coarse indicator that provides a Group-Bitmap to enable determination of which SSB groups are transmitted. As shown at 354, the configuration may include a second indicator that may contain information to enable a determination of SS/PBCH blocks are transmitted within an SS group. The second indicator at 354 may be a fine indicator that provides a Bitmap in Group to enable determination of which SS/PBCH blocks are transmitted within an SSB group, e.g., within a transmitted SSB group.

At 360, one or more actually transmitted SSBs may be monitored. The one or more actually transmitted SSBs may correspond to the SSBs for which the configuration is received at 350.

Figure 3B:
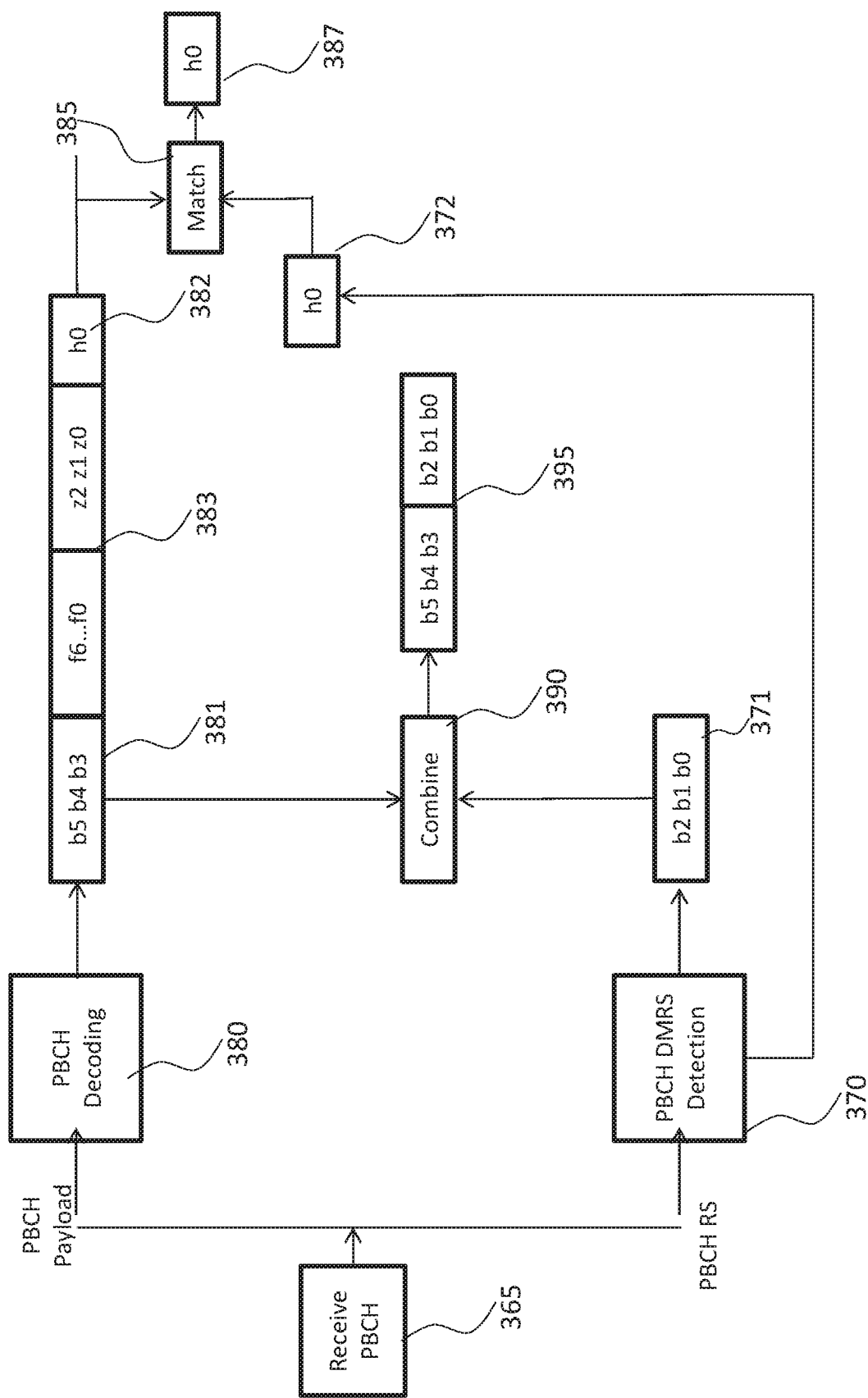
FIG. 3B shows an example diagram for determining a SSB timing index indicator and half radio frame indicator.

FIG. 3B shows an example diagram for determining SSB presence, index, and HRF for a SSB with a frequency band that is greater than or equal to a threshold frequency band, as disclosed herein. As noted in FIG. 3A, a portion of the SSB block may be determined implicitly and a portion may be determined explicitly for SSBs with a frequency band greater than a threshold frequency band. As shown in FIG. 3B, a signal with a PBCH may be received at 365 and a determination may be made that a characteristic of the signal, such as a frequency band, is greater than or equal to a threshold, such as a frequency threshold. Based on the determination, a hybrid technique for SSB index indication may be applied such that, at 370 an implicit determination is made and at 380 an explicit determination is made. At 370, a portion 371 of the SSB index may be indicated based on PBCH DMRS detection. Additionally, a half radio frame indicator 372 may also be indicated based on PBCH DMRS detection. At 380, a portion 381 of the SSB index may be indicated based on PBCH payload decoding. Additionally, a half radio frame indicator 382 may also be indicated based on PBCH payload decoding.

At 385, the half radio frame indicator 382 indicated via the explicit PBCH decoding at 380 may be compared to the half radio frame indicator 372 indicated via the implicit PBCH DMRS detection at 370. A match of the two half radio frame indicators 372 and 382 may result in the determination and/or confirmation of the half radio frame indicator h0 387.

The portion 371 of the SSB index indicated via the explicit PBCH decoding at 380 may be combined with the portion 381 of the SSB index indicated via the implicit PBCH DMRS detection at 370 at 390. The combining may provide the SSB timing index indicator 395 that includes, for example, bits indicated via the PBCH decoding 38 and the PBCH DMRS detection 370. Additionally, the PBCH channel and payload may be decoded to obtain other timing information 383 such as a system frame numbers.

As disclosed herein, SSB index time indications may be based on frequency bands. A value L may vary based on frequency bands and may denote a maximum number of SSBs in a SS burst set. Higher frequency bands may employ larger number of beams while lower frequency bands may employ smaller number of beams. Accordingly, as an example, a larger L may correspond to a higher frequency band and a smaller L may correspond to a lower frequency band. Further, SSB index time indications, SSB index frequency indications, or combination of SSB index time and frequency indications may be based on frequency bands. It will be understood that the solutions disclosed herein for SSB index indication may be applied to SSB index time and/or frequency indication. As a non-limiting example, an SSB index time and/or frequency indication may be received via a multi-level two stage compressed indication.

According to an embodiment, an SSB index time indication technique may be determined based on a threshold value such that an SSB with a characteristic lower than the threshold value may result in indicating a SSB index using an first method and a characteristic higher than the threshold value may result in indicating n SSB index using a second different method. The threshold value may be a threshold L value and may be an integer value such as, for example, 16. For a given SSB if L<threshold L value, such as L=2, 4 or 8, an SSB index may be indicated using a first method. The first method may include implicit methods which may employ, for example, CRC masking, sequence-based indications, indication using DMRS, scrambling, or the like. According to such implicit methods, L CRC masks or L sequences, L hypotheses, L hypotheses using DMRS, scrambling, etc. may be used. If L>threshold L value, such as L=64, SSB index may be indicated using another method. For example, an SSB index may be carried in NR-PBCH using explicit methods, implicit methods or combination of explicit and implicit methods such as a hybrid method. It will be understood that an L value may be determined based on the configuration of a WTRU such that, for a given configuration such as a frequency band associated with the WTRU, a corresponding L value may be determined.

SSB index indication may be based on L in a hybrid method such that an implicit SSB index indication is used if L<T where T=16, L=4 and 8 and an explicit SSB index indication is used if L>=T where T=16 and L=64. SSB index indications may be based on L in another hybrid method such that an implicit SSB index indication is used if L<T where, for example, T=16, L=4 and 8, and a combination of implicit and explicit SSB index indication is used if L>=T where, for example, T=16 and L=64

According to another hybrid method, LSBs for SSB index may be indicated using CRC masking or sequence-based indication, indication using DMRS, scrambling, etc., whereas MSBs for SSB index may be indicated in a payload or signal. For example, K1 bits for LSB may be indicated using PBCH CRC masking or sequence-based indication, indication using DMRS, scrambling, etc., and K2 bits for MSB may be indicated in a PBCH payload or PBCH signal.

A unified hybrid method across different frequency bands for SSB index may be implemented such that a WTRU or any applicable device may perform any one or a combination of receiving a PBCH signal and decoding a PBCH channel, performing CRC demasking or sequence-based detection, detection using DMRS, descrambling, etc., obtaining K1 bits from CRC demasking or sequence-based detection, detection using DMRS, descrambling, etc., and mapping, and/or outputting K1 bits as an SSB index time indication. For higher frequency bands, a WTRU or other applicable device may continue to perform any one or a combination of obtaining K2 bits from control field of the decoded PBCH channel and outputting both K1 and K2 bits as SSB index time indication bits. Here, K1 may be the LSBs for SSB index time indication and K2 may be the MSBs for SSB index time indication.

Figure 4:
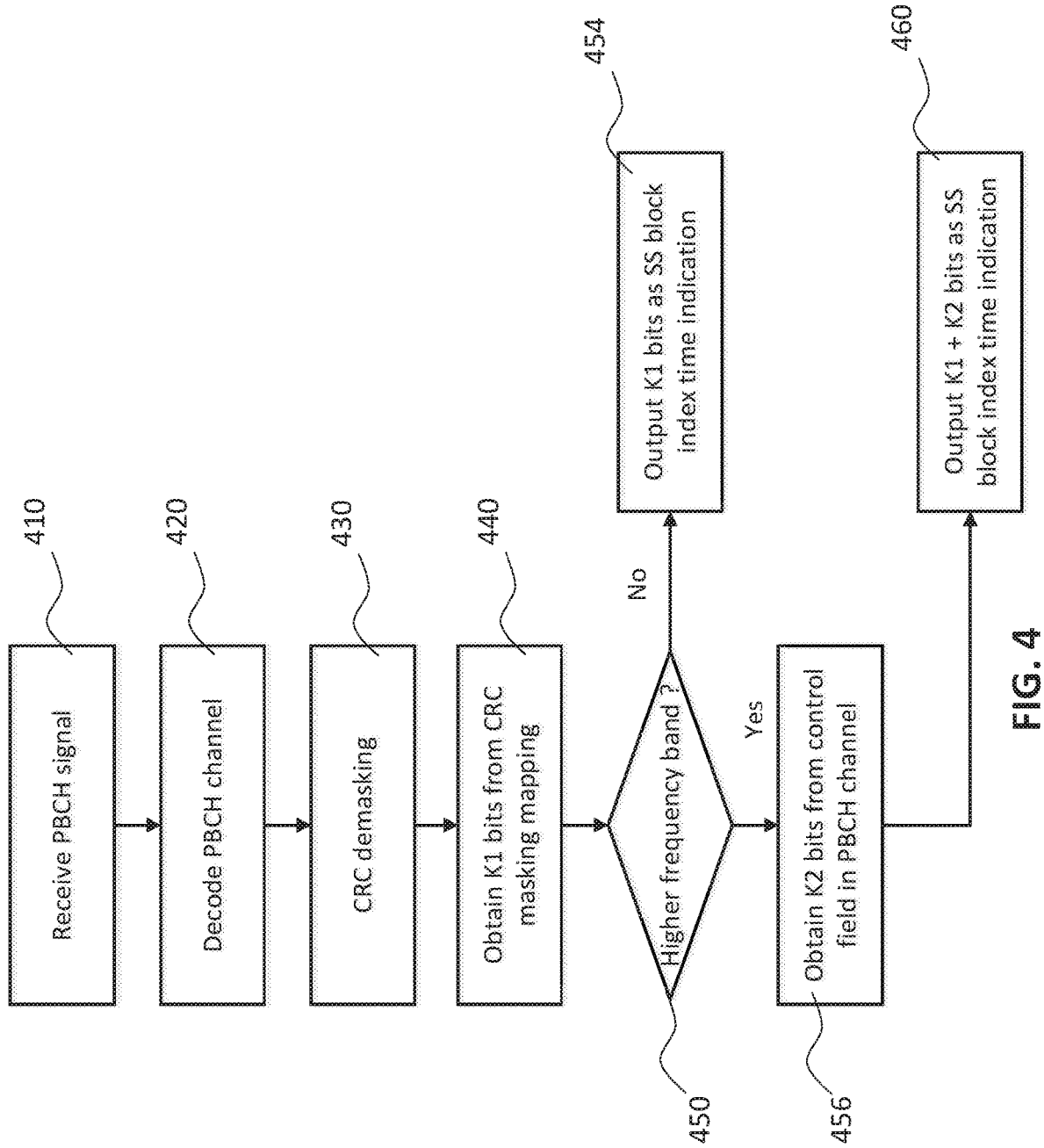
FIG. 4 shows an example SSB index time indication employing hybrid CRC masking and control field.

FIG. 4 shows an example SSB index time indication employing hybrid CRC masking and control field. As shown, at 410, a PBCH signal is received. At 420, a PBCH channel is decoded and a CRC is demasked at 430. As a result of the CRC demasking at 430, K1 bits may be obtained from the CRC masking mapping at 440. At 450, a determination whether the frequency meets a frequency band threshold is made. The determination may be made based on whether the frequency is greater than, equal to, or less than a threshold frequency. If the frequency is below the threshold frequency, K1 bits are output as a SSB index time indication at 454. If the frequency is above the threshold frequency, K2 bits are obtained from a control filed in the PBCH channel at 456 and K1+K2 bits are output as a SSB index time indication at 460.

Table 1 shows an example CRC masking table for an SSB index time indication where of L=4. As shown, the CRC masking #0 may correspond to SSB index time indication bits 00 and CRC masking #3 may correspond to SSB index time indication bits 11.

TABLE 1

| CRC masking | |
| --- | --- |
| CRC masking | SSB index time indication bits (L = 4) |
| CRC # 0 | 00 |
| CRC # 1 | 01 |
| CRC # 2 | 10 |
| CRC # 3 | 11 |

According to another hybrid method, scrambling processing may be used for to indicate SSB indexes and LSBs for SSB index and MSBs for SSB indexes may be indicated in payloads or signals. For example, K1 bits for LSBs of an SSB index may be indicated using PBCH scrambling and K2 bits for MSBs of SSB index may be indicated in PBCH payload or PBCH signal.

For lower frequency bands, a WTRU or other applicable device may perform one or more of receiving a PBCH signal and descrambling a PBCH channel, decoding a PBCH channel, performing CRC verification, obtaining K1 bits from scrambling mapping and CRC verification, and outputting K1 bits as SSB index time indication. For higher frequency bands, a WTRU or other applicable device may additionally perform one or more of obtaining K2 bits from control field of decoded a PBCH channel, and outputting both K1 and K2 bits as SSB index time indication bits. K1 may be the LSBs for SSB index time indication and K2 may be the MSBs for SSB index time indication.

Figure 5:
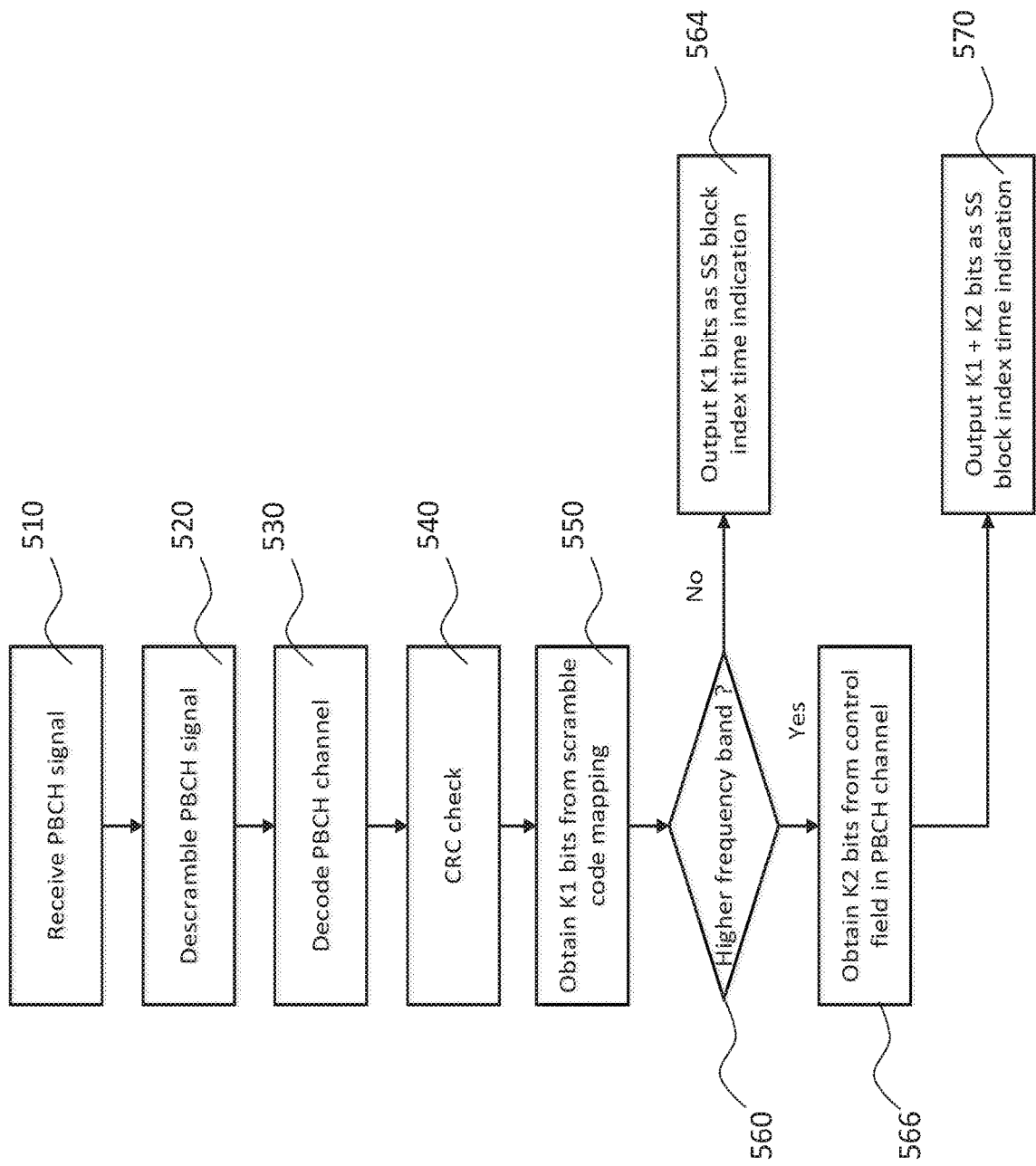
FIG. 5 shows an SSB index time indication employing hybrid scrambling code and control field.

FIG. 5 shows an example SSB index time indication employing a hybrid scrambling code and control field. As shown, at 510, a PBCH signal is received. At 520, a PBCH signal is descrambled a PBCH channel is decoded at 530. At 540 a CRC check is conducted and K1 bits are obtained from applicable scramble code or scramble code mapping at 550. For example, scramble code or scramble code mapping may be performed for a PBCH, such as PBCH DMRS and/or PBCH payload. At 560, a determination whether the frequency meets a frequency band threshold is made. The determination may be made based on whether the frequency is greater than, equal to, or less than a threshold frequency. If the frequency is below the threshold frequency, K1 bits are output as a SSB index time indication at 564. If the frequency is above the threshold frequency, K2 bits are obtained from a control filed in the PBCH channel at 566 and K1+K2 bits are output as a SSB index time indication at 570.

According to another hybrid method, SSB index indication may be based on partitioning. Here, SSB index indication may be implicit for least significant bits (LSBs) such as, for example, K1 bits, and explicit for most significant bits (MSBs) such as, for example, K2 bits. The L threshold value used in such a solution may be, for example, 16 or 64. Alternatively or in addition, the SSB index may be partitioned into two parts including SSB index within an SS burst (SSB group) and SS burst index (SSB group index) within a SS burst set. An SS burst may be a SSB group or the like. An SS burst index may be SSB group index or the like. The SSB index indication may be implicit for SSB index within an SS burst, for example, for K1 bits, and explicit for SS burst index within an SS burst set, for example, for K2 bits. The L threshold value used in such a solution may be, for example, 16 or 64. Alternatively or in addition, the SSB index bits may be partitioned into two parts based on K1 bits and K2 bits. The SSB indication may be explicit for SSB index, such as, for example, for K1 bits if only K1 bits are present and may be implicit for SSB index based on K2 if total bits exceed K1 bits.

SSB index indication for one partition may be explicit such that part of an SSB index may correspond to part of a payload on NR-PBCH. For example, K2 bits may be carried in a PBCH payload. The K2 bits may be coded, rate-matched and interleaved along with other bits of a NR-PBCH and transmitted on data resource elements (RE). An explicit transmission may suffer from delay in decoding such that, for example, an SSB index may not be determined until decoding of the NR-PBCH at a receiver. Accordingly, for coherently detecting the NR-PBCH, a self-contained DMRS may be added. Although the DMRS may comprise one or more sequences known to a receiver, different sequences and shifts may be applied to implicitly indicate a part of an SSB index such as the part that is not explicitly indicated. As an example, K1 bits may be indicated implicitly using a DMRS and a receiver may detect which hypothesis of a DMRS variation is mostly likely transmitted to implicitly decode the SSB index. Accordingly, the receiver may not wait for an entire PBCH to be decoded to determine the SSB index.

A DMRS may comprise a gold sequence such that two M sequences may be generated and two different cyclic shifts m0 and m1 for the two M sequences may undergo an XOR operation with each other. The resulting sequence may be binary phase shift keying (BPSK) modulated and then may be repeated or truncated to fill the DMRS. A WTRU or other applicable device may use a combination function of m0 and m1 to indicate SSB index. Table 2 shows an example number of bits and number of m combinations (m0, m1) that correspond to L, a number of SSBs.

TABLE 2

| L (# of SSBs) | # of bits | # of m combinations (m0, m1) |
|---|---|---|
| 4 | 2 | 4 |
| 8 | 3 | 8 |
| 6 | 6 | 64 |

As an example, for L=4, the m0 and m1 combinations of Table 3 may be applied. As shown, a 0 SSB index may correspond to a (m0 m1) combination of (0 1).

TABLE 3

| SSB index | (m0 m1) combination |
|---|---|
| 0 | (0 1) |
| 1 | (0 2) |
| 2 | (1 2) |
| 3 | (1 3) |

A DMRS may comprise one M sequence where m0 may be used to indicate SSB index. Table 4 shows an example number of bits and number of m0 values that correspond to L, a number of SSBs. As shown, as an example, 4 SSBs may correspond to 2 bits and 4 m0 m sequences.

TABLE 4

| L (# of SSBs) | # of bits | # of m0 (m sequence) |
|---|---|---|
| 4 | 2 | 4 |
| 8 | 3 | 8 |
| 64 | 6 | 64 |

As an example, for L=4, the m0 values of Table 5 may be applicable. As shown, a 0 SSB index may correspond to a 0 m0 value.

TABLE 5

| SSB index | m0 |
|---|---|
| 0 | 0 |
| 1 | 1 |
| 2 | 2 |
| 3 | 3 |

A DMRS may comprise multiple M sequences where sequence IDs and shift m0 may be used to indicate SSB index.

A DMRS may comprise a Zadoff-Chu (ZC) sequence. ZC sequences may be used to indicate an SSB index such that CS may be used to indicate the SSB index, a root index of ZC may be used to indicate the SSB index, or a combination of CS and root index may be used to indicate SSB index. Table 6 shows an example number of bits and number of CS values that correspond to L, a number of SSBs.

TABLE 6

| L (# of SSBs) | # of bits | # of CS (ZC) |
|---|---|---|
| 4 | 2 | 4 |
| 8 | 3 | 8 |
| 64 | 6 | 64 |

As an example, for L=4, the CS ZC values of Table 7 may be applicable. As shown, a 0 SSB index may correspond to a 0 CS value and a 3 SSB index may correspond to a 36 CS value.

TABLE 7

| SSB index | CS (ZC) |
|---|---|
| 0 | 0 |
| 1 | 12 |
| 2 | 24 |
| 3 | 36 |

A DMRS may comprise a ZC sequence with a cover code and the cover code may be another sequence such as an m sequence. The ZC and the cover code may be multiplied or XORed with each other and m0 may be used to indicate SSB indexes. Table 8 shows an example number of bits and number of m0 values that are ZC multiplied or XORed with a cover code and that correspond to L, a number of SSBs.

TABLE 8

| L (# of SSBs) | # of bits | # of m0 (ZC with m sequence) |
|---|---|---|
| 4 | 2 | 4 |
| 8 | 3 | 8 |
| 64 | 6 | 64 |

Alternatively, a combination of CS (ZC) and m0 (M) may be used to indicate SSB indexes where a DMRS comprises a ZC sequence with a cover code and the cover code is another sequence such as an m sequence. The ZC and the cover code may be multiplied or XORed with each other. Table 9 shows an example number of bits and number of CS (ZC) and m0 (M sequence) combination values that correspond to L, a number of SSBs.

TABLE 9

| L (# of SSBs) | # of bits | # of CS (ZC) and m0 (M sequence) combinations |
|---|---|---|
| 4 | 2 | 4 |
| 8 | 3 | 8 |
| 64 | 6 | 64 |

As an example, for L=4, the CS (ZC) and m0 (M sequence) combinations (CS, m0) shown in Table 10 may be applicable. As shown, a 0 SSB index may correspond to a (0,0) CS (ZC) and m0 (M sequence) combination (CS, m0) and a 3 SSB index may correspond to a (12, 1) CS (ZC) and m0 (M sequence) combination (CS, m0).

TABLE 10

| SSB index | CS (ZC) and m0 (M sequence) combinations (CS, m0) |
|---|---|
| 0 | (0, 0) |
| 1 | (0, 1) |
| 2 | (12, 0) |
| 3 | (12, 1) |

According to a method, DMRS positions or locations may be used to indicate SSB indexes. Table 11 shows an example number of bits and number of DMRS positions that correspond to L, a number of SSBs.

TABLE 11

| L (# of SSBs) | # of bits | # of DMRS positions |
|---|---|---|
| 4 | 2 | 4 |
| 8 | 3 | 8 |
| 64 | 6 | 64 |

As an example, for L=4, the DMRS positions shown in Table 12 may be applicable. As shown, a 0 SSB index may correspond to a position X and a 3 SSB index may correspond to a position W.

TABLE 12

| SSB index | DMRS positions |
|---|---|
| 0 | Position x |
| 1 | Position y |
| 2 | Position z |
| 3 | Position w |

According to a method, a combination of DMRS positions/locations and sequences may be used to indicate SSB indexes. A subset of bits, or example, one or two bits, may be indicated via the DMRS location. Bits not indicated by the DMRS location may be indicated via one or more sequences. A combination of CS and/or m0/m1 and/or positions may be used to indicate SSB indexes. Table 13 shows an example number of bits and number of CS (ZC), m0 (m sequence) and position combination that correspond to L, a number of SSBs.

TABLE 13

| L (# of SSBs) | # of bits | # of CS (ZC), m0 (m sequence) and positions combinations |
|---|---|---|
| 4 | 2 | 4 |
| 8 | 3 | 8 |
| 64 | 6 | 64 |

According to a method, DMRS phase rotation of OFDM symbols may be used to indicate SSB indexes. A subset of bits may be indicated via phase rotations and another subset or the rest of the bits may be indicated via sequences. For example, for multiple OFDM symbols, phase rotation may be applied on the second or remaining N−1 PBCH OFDM symbols with respect to the first PBCH OFDM symbol for total N PBCH OFDM symbols. Alternatively, some bits may be indicated via the phase rotations for some resource blocks (RBs) while other bits may be indicated via the phase rotations for other RBs.

According to a method, different scrambling codes may be used for PBCH OFDM symbols to indicate SSB indexes. Table 14 shows an example number of bits and number of scrambling code combinations that correspond to L, a number of SSBs.

TABLE 14

| • L (# of SSBs) | # of bits | # of scrambling code combinations of two symbols |
|---|---|---|
| 4 | 2 | 4 |
| 8 | 3 | 8 |
| 64 | 6 | 64 |

Gold sequences or m sequences may be generated using polynomials. For example, if the length of the M sequences is 31, which may be repeated, a combination of the following polynomials may be used:

$$g(x)=x5+x2+1$$

$$g(x)=x5+x4+x3+x2+1$$

$$g(x)=x5+x4+x2+x+1$$

As another example, if the length of M Sequences is 63, such as for higher density DMRS, a combination of the following polynomials may be used:

$$g(x)=x^6+x+1$$

$$g(x)=x^6+x^5+x^2+x+1$$

$$g(x)=x^6+x^5+x^3+x^2+1$$

It will be understood that other polynomials such as irreducible primitive polynomials may also be used. Further, Cyclic Shifts in two sequences may be defined using following the equations:

$$s_1^{(m0)}(n)=\tilde{s}_1((n+m0) \bmod L)$$

$$s_2^{(m1)}(n)=\tilde{s}_2((n+m1) \bmod L)$$

where the s1, s2 correspond to two m sequences of length L. Additionally, m0 and m1 may correspond to two cyclic shifts, and the value of n may range from 0 to L−1.

It will be understood that any one or a combination of the methods described herein may be used for SSB index indication.

It will also be understood that in addition or as an alternative to DMRS indication, implicit solutions for hybrid indication may also use scrambling, CRC, and/or Redundancy Version (RV).

A 1-bit for Repetition Indication may also be used. Such 1-bit for Repetition Indication may use DMRS, scrambling, CRC, and/or RV for SSB index indication. Such 1-bit for Repetition Indication may also be carried in a PBCH payload. Additionally, an additional 1-bit for half radio frame indication may also be used. Such 1-bit for half radio frame indication may utilize DMRS, scrambling, CRC, RV for indication. Such 1-bit for half radio frame indication may also be carried in PBCH payload. For example, such 1-bit for half radio frame indication may be indicated or carried in scrambling and PBCH payload.

Methods for performing SSB transmission such as with timing information indication are described herein.

According to an implementation, an implicit indication method for SSB transmission is used if a characteristic, such as a frequency, is lower than a threshold. For example, an implicit indication technique for SSB transmission is used if the frequency is lower than a threshold frequency of 6 GHz. As a specific example of an implicit indication technique, a sequence based indication method may be used. A number of bits, such as X bits, may be encoded implicitly using a sequence such as a reference sequence. The SSB index may be encoded in a scrambling sequence such as, for example, a PN code. A DMRS may be used to encode the SSB index indication such that, for example, a scrambling sequence or PN code may be used for a DMRS to indicate SSB index. Alternatively, an SSB index may be encoded in CRC, scrambling for payload or using other implicit methods. Scrambling may be a function of SSB index. Scrambling, whethersame or different, may be used for DMRS and/or payload in PBCH.

A hybrid indication method for SSB transmission may be used of a characteristic, such as a frequency, is higher than a threshold. For example, if the frequency is equal to or higher than 6 GHz, then a hybrid indication method may be used. A hybrid indication method may employ both implicit and explicit indication techniques such as, for example, a combination of DMRS and PBCH payload may be used. A number of bits, such as X bits, of an SSB index may be encoded in PBCH DMRS sequences and another number or the remaining bits, such as Y bits, of an SSB index may be encoded in PBCH payload. To facilitate A PBCH payload may reserve X+Y bits for the SSB index to facilitate the encoding. Additionally, if the frequency is lower than the threshold, such as lower than 6 GHz in this example, then Y bits may be reserved or Y bits or a subset of Y bits may be reused for other purposes such as assisting the indication of the location of cell-defining SSB or for supporting additional system operations such as assisting the indication of presence/absence of cell-defining SSB.

Figure 6:
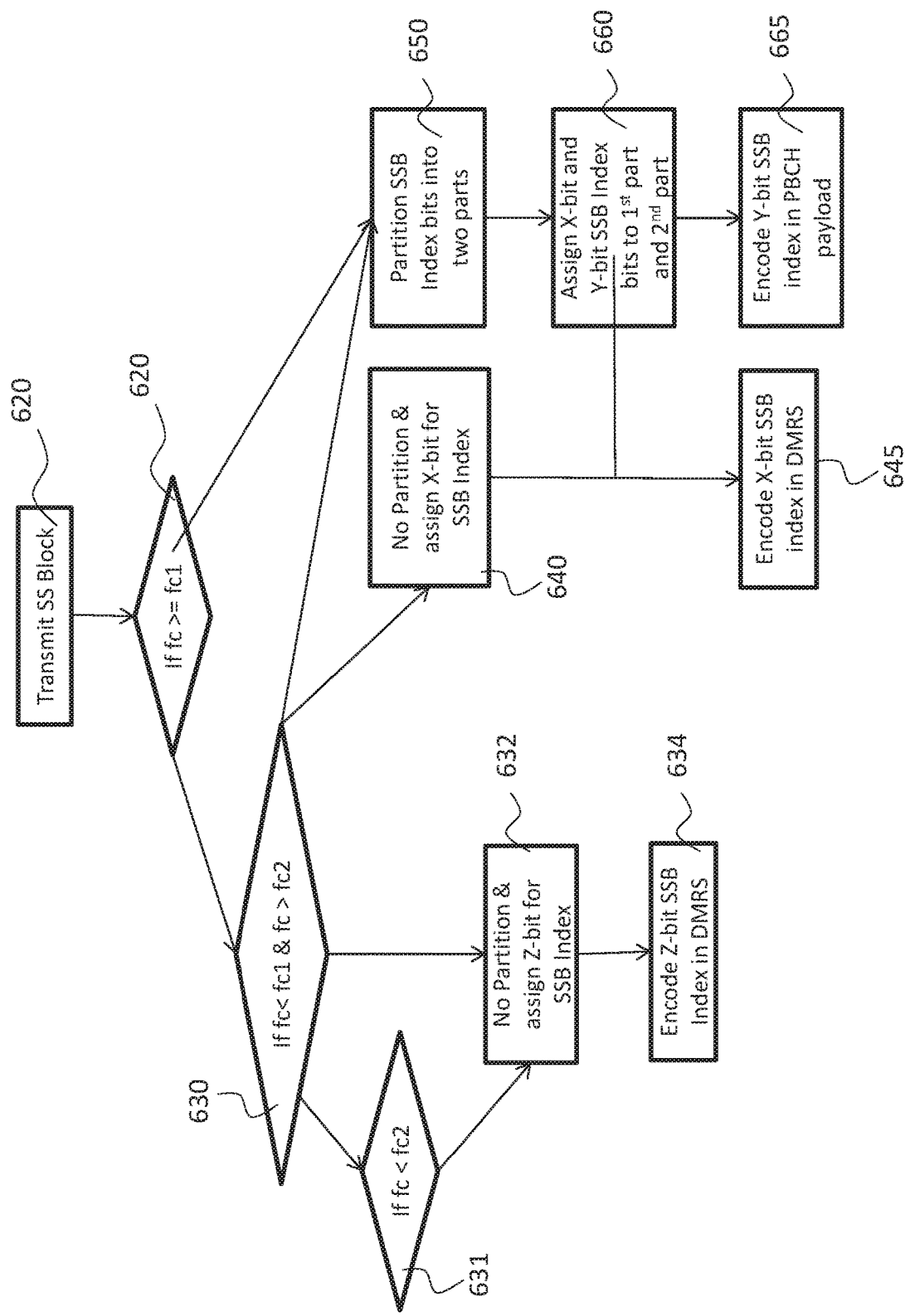
FIG. 6 shows an SSB transmission method.

FIG. 6 shows an illustrative example of a SSB transmission method. At 610, an SSB is transmitted via a downlink. An SSB transmission may be carrier frequency dependent or frequency band dependent. For example, at 620 a determination may be made whether a carrier frequency fc is high such that it is higher than or equal to a certain predefined carrier frequency fc1 where fc>=fc1. If fc is determined to be greater than or equal to fc1, then the SSB index bits may be partitioned into two parts at 650. A first part of the SSB index may be assigned X bits and a second part SSB index may be assigned Y bits at 660 where the total SSB index bits are Nt bits which is equal to X+Y bits. The first part of the SSB index, such as the assigned X bits may be encoded via a DMRS at 645. The second part of the SSB index, such as the assigned Y bits, may be encoded in PBCH payload such as the data channel and may be encoded in the PBCH data channel using encoding operation of Polar codes.

As shown at 630, a determination that carrier frequency fc is high but not higher than a certain predefined carrier frequency fc1 such that fc<fc1, but higher than another predefined carrier frequency fc2 such that fc>fc2, and fc2<fc1 may be made. If, fc>fc2, and fc2<fc1 then the SSB index may be partitioned into two parts at 650. It will be understood that the determinations 620 and 630 may occur at the same time or simultaneously and may be made inherently based on the frequency fc and without a determination being made. If partitioned, at 660, a first part of the SSB index may be assigned X bits and a second part of the SSB index may be assigned Y bits. Alternatively, if partitioned, a second part of the SSB index may not be assigned any bit. If partitioned and if the second part SSB index is assigned Y bits, the total SSB index bits may be Nt, which equals X+Y bits. If the second part SSB index is not assigned any bit, the total SSB index bits may be Nt=X bits. At 645, the first part SSB index may be encoded in DMRS such that X bits for the first part of the SSB index may be encoded using a DMRS sequence. If the second part SSB index is assigned bits, then, at 665, Y bits for the second part SSB index may be encoded in the PBCH data channel using, for example, an encoding operation of Polar codes. Alternatively, Y bits for the second part SSB index may be ignored or discarded. Alternatively, Y bits for the second part SSB index may be reused for other system information or control information purposes.

As shown at 630, a determination that carrier frequency fc is high but not higher than a certain predefined carrier frequency fc1 such that fc<fc1, but higher than another predefined carrier frequency fc2 such that fc>fc2, and fc2<fc1 may be made. If fc>fc2, and fc2<fc1 then the SSB index may not be partitioned into parts at 640. It will be understood that the determinations 620 and 630 may occur at the same time or simultaneously and may be made inherently based on the frequency fc and without a determination being made. At 640, the entire SSB index may be assigned X bits. The total SSB index bits may be designated by Nt which equals X bits. At 645, the SSB index may be encoded in DMRS such that X bits for the SSB index may be encoded using the DMRS sequence.

As shown at 631, a determination carrier frequency fc is low and lower than a predefined carrier frequency fc2 such that fc<fc2 may be made. If fc<fc2 then the SSB index may not be partitioned into parts. It will be understood that the determinations 620, 630, and 631 may occur at the same time or simultaneously and may be made inherently based on the frequency fc and without a determination being made. The SSB index may be assigned Z bits. The total SSB index bits are Nt=Z bits. The SSB index may be encoded in DMRS. Z bits for the SSB index may be encoded using DMRS sequence.

A PBCH data channel and reference signal, such as a DMRS, may be received. It will be understood that the PBCH data channel and reference signal may be received separately or may be received together. A portion of SSB time index bits may be obtained by detecting the PBCH reference signal. Additionally, the PBCH data channel may be descrambled and decoded using a channel-coding scheme such as via Polar codes. Another portion of the SSB time index bits may be obtained by decoding the PBCH channel and payload. A complete set of bits for the SSB time index bits may be obtained by combining the portion of the SSB time index obtained via the PBCH reference signal, such as the DMRS, and the portion of the SSB time index obtained via the decoded PBCH data channel. Additionally, the PBCH channel and payload may be decoded to obtain other timing information such as a system frame number and/or half radio frame number.

Figure 7:
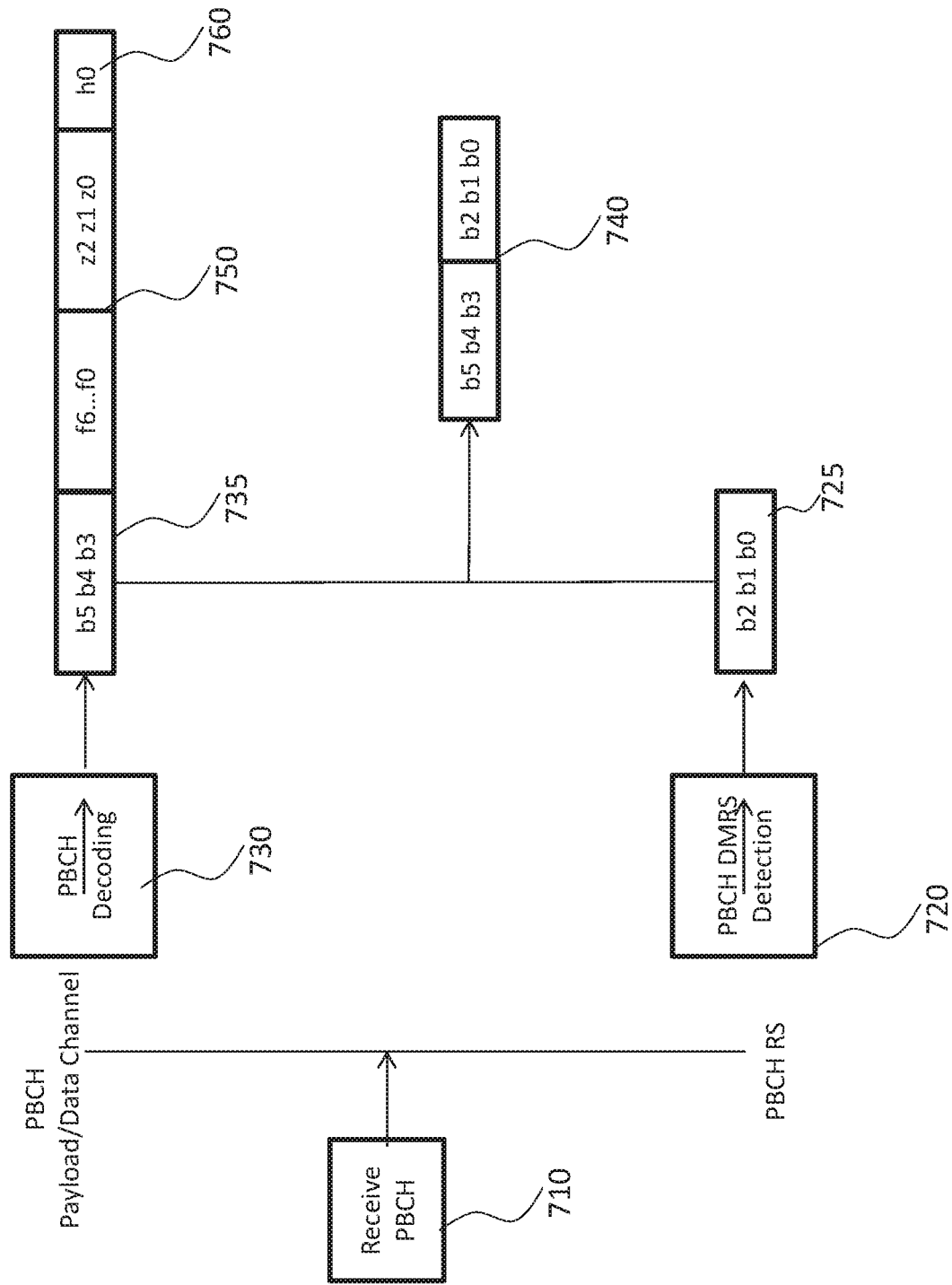
FIG. 7 shows an SSB timing information indication method.

FIG. 7 shows an example SSB timing information indication method. At 710, a WTRU may receive a PBCH reference signal and data channel. At 720, the WTRU may detect a DMRS via the reference signal and may obtain a part of the SSB time index bits by detecting the DMRS reference signal. As shown at 725, bits b2, b1, and b0 for part of a SSB time index may be received. At 730, the WTRU may receive the PBCH data channel and may descramble and decode the PBCH channel using a channel coding scheme such as via Polar codes. The WTRU may obtain another part of the SSB time index by descrambling and/or decoding the PBCH channel such as bits b5, b5, and b3 as shown at 735. A complete set of bits b0, b1, b2, b3, b4, and b5 for the SSB time index bits may be obtained at 740 by combining the portion of the SSB time index obtained via the PBCH reference signal, such as the DMRS, at 725 and the portion of the SSB time index obtained via the decoded PBCH data channel at 735. Additionally, the PBCH channel and payload may be decoded to obtain other timing information such as a system frame number indicator 750 and/or half radio frame number 760.

Methods for performing sequence based SSB transmissions are disclosed herein. According to a first method, an SSB index may be encoded in a sequence such as DMRS for SSB transmission. According to a method, multiple sequences may be generated where a Sequence A, or sequence type A, may be a function of a cell ID and a Sequence B, or sequence type B, may be a function of cell ID and an SSB index. Sequences, such as sequence A and B, may be generated using initialization, cyclic shifts, frequency shifts, etc. The initialization of sequence A may be a function of cell ID and the initialization of sequence B may be a function of cell ID and SSB index. Cyclic shifts and/or frequency shifts of sequence A may be a function of cell ID and cyclic shifts and/or frequency shifts of sequence B may be a function of cell ID and SSB index. Sequences may be multiplied with phase rotations based on the SSB index and may have the same or different lengths.

A DMRS sequence may be mapped to DMRS REs. A DMRS sequence A may be mapped to DMRS REs within a first set of PBCH OFDM symbols. A DMRS sequence B may be mapped to DMRS REs within a second set of PBCH OFDM symbols. A set of PBCH OFDM symbols may contain one or more OFDM symbols. For each PBCH OFDM symbol, DMRS sequences to DMRS REs may be mapped for lower frequency index, subcarrier index or RE index and higher frequency index, subcarrier index or RE index separately and/or at different times. The lower frequency index, subcarrier index, or RE index may be mapped before the higher frequency index, subcarrier index or RE index.

According to another method, multiple sequences where a sequence A, or sequence type A, is a function of cell ID and a sequence B, or sequence type B, is a function of cell ID and a SSB index. Sequences such as sequences A and B may be generated using initialization, cyclic shifts, frequency shifts, etc. Sequences may be multiplied with phase rotations based on a SSB index and may have the same or different lengths. DMRS sequence length may be a function of an RE mapping method such that if a DMRS is mapped to the REs overlapping with SSS bandwidth, then the DMRS may have a length L1. If a DMRS is mapped to the REs not overlapping with SSS bandwidth, then the DMRS may have length L2. Length L1 may not equal length L2 such that, for example, length L1 may be equal or less than length L2.

A DMRS sequence may be mapped to DMRS REs using any one or a combination of methods.

According to a DMRS sequence mapping method, a DMRS sequence A of length L1 may be mapped to DMRS REs within a first set of PBCH OFDM symbols and a DMRS sequence B, of length L2, may be mapped to DMRS REs within a second set of PBCH OFDM symbols. Length L1 may be equal to length L2. When mapping a DMRS sequence to DMRS REs, REs may be mapped in frequency first separately from being mapped in time. The Res may be mapped in frequency first and then may be mapped in time. For example, mapping DMRS sequence to DMRS REs may start with a lower frequency index, subcarrier index or RE index and then a higher frequency index, subcarrier index or RE index later. The mapping may then continue for a subsequent time such as, for a OFDM symbol index, slot index, non-slot index or mini-slot index.

According to another DMRS sequence mapping method, a DMRS sequence A of length L1 may be mapped to DMRS REs in DMRS REs overlapping with SSS bandwidth within a first set of PBCH OFDM symbols. A DMRS sequence B of length L2 may be mapped to DMRS REs in DMRS REs overlapping with SSS bandwidth within a first set of PBCH OFDM symbols and all DMRS REs within a second set of PBCH OFDM symbols. Length L1 may be different from length L2. For example, length L2 may be equal or greater than length L1. When mapping a DMRS sequence to DMRS REs, the REs may be mapped in frequency separately than in time such as being mapped in frequency first then being mapped in time. For example, mapping a DMRS sequence to DMRS REs may start with a lower frequency index, subcarrier index or RE index than a higher frequency index, subcarrier index or RE index later. The mapping may continue for a subsequent time such as, for example OFDM symbol index, slot index, non-slot index or mini-slot index.

According to another DMRS sequence mapping method, DMRS sequence A of length L1 may be mapped to DMRS REs in DMRS REs overlapping with SSS bandwidth within a first and second set of PBCH OFDM symbols. A DMRS sequence B of length L2 may be mapped to DMRS REs in DMRS REs overlapping with SSS bandwidth within the first and second set of PBCH OFDM symbols. Length L1 may be different from length L2. For example, length L2 may be equal or greater than length L1. When mapping a DMRS sequence to DMRS REs, the REs may be mapped in frequency separately than in time such as being mapped in frequency first then being mapped in time. For example, mapping a DMRS sequence to DMRS REs may start with a lower OFDM symbol index, slot index or mini-slot index than a higher lower OFDM symbol index, slot index or mini-slot index later. The mapping may continue for a subsequent time such as, for example OFDM symbol index, slot index, non-slot index or mini-slot index.

DMRS RE positions may be fixed or may be a function of cell ID. A DMRS RE position may be a function of a shift, which may be a function of cell ID. A DMRS RE position offset may be a function of a shift, which may be a function of cell ID. A DMRS RE position and/or offset may be fixed or employ a fixed offset.

Indications of used or unused SS blocks may be provided based on techniques disclosed herein. Reusing unused SSBs for transmission may allow system resources to be more efficiently utilized and system throughput to be enhanced. Unused SSB may be indicated by one or more methods including, but not limited to, simple bitmap, star point with duration and/or number of used SSBs, hybrid starting point with segment-wise bitmap, or the like.

In accordance with a simple bitmap method, an L-bit indicator may be used to indicate unused SSBs. The L-bit indicator may employ a simple bitmap such as, for example, for N unused SSBs, L bits with N unused bit locations, being marked as unused, may be used. A value, such as "0", may be used to mark unused SSBs and a different value, such as "1" may be used to mark used SSBs. For L=64 SSBs, 64 bits signaling overhead may be required.

In accordance with a start point with duration and/or number of used SSBs method, two indicators may be used such that one indicator may indicate the starting point of used or unused SSBs, and the other indicator may be used to indicate the number of used or unused SSBs. As an example, a $N_{start}$ starting points indicator may be used such that $\log_2(N_{start})$ bits may be needed. In addition, $\log_2(N$ unused) bits may be needed to indicate unused SSBs. Accordingly, a total of $\log_2(N_{start})+\log_2(N$ unused) bits may be needed. As an example, for $N_{start}=64$ and $N_{unused}=16$, a maximum of 10 overhead bits may be required. Using this method may result in a significant reduction in signaling overhead, compared to using the simple bitmap method.

In accordance with a hybrid method such as a hybrid starting point with segment-wise bitmap, two indicators may be used such that one indicator may indicate the starting point and the other indicator may indicate the used or unused SSBs associated with the indicated starting point. As an example, for $N_{start}=4$ and $N_{SS\_block,i}=16$, where i=1,2,3,4, maximum 2+16 bits overhead may be required. This may indicate a starting point and $N_{SS\_block,i}$ associated with the i-th starting point. If extended to indicate two starting points, then 2×(2+16)=36 bits signaling overhead may be required.

Figure 8:
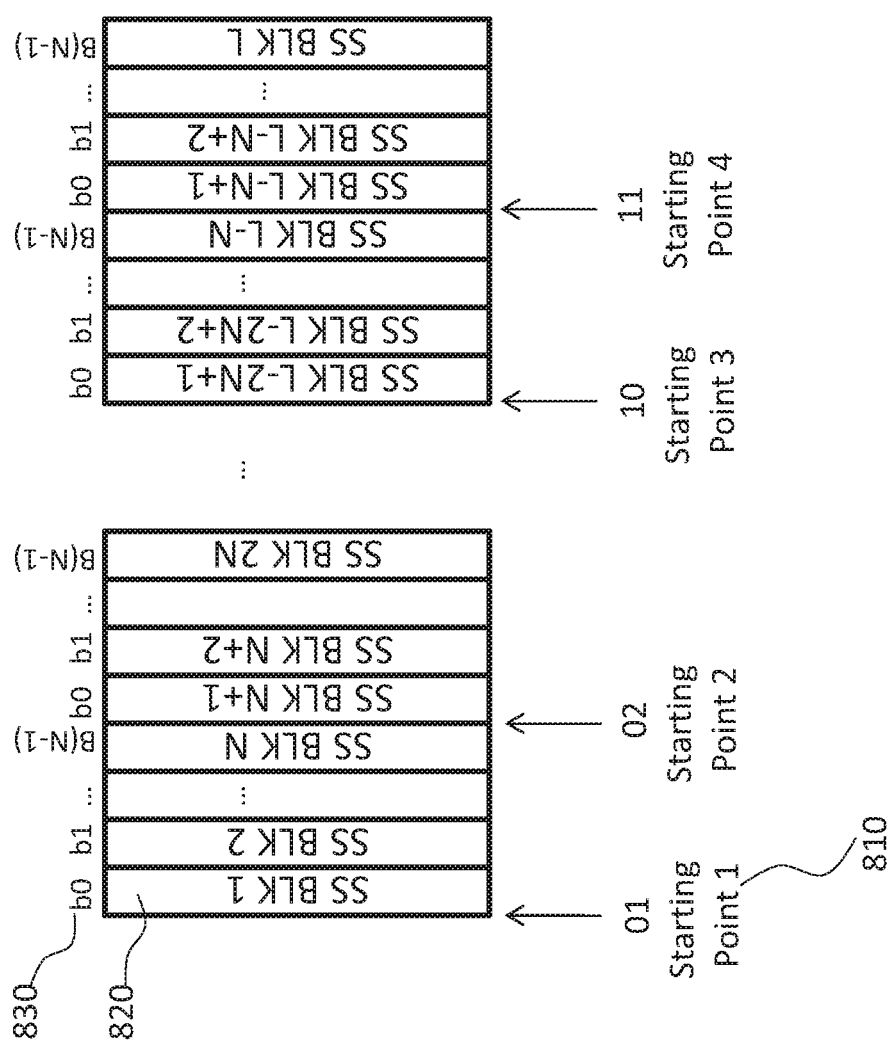
FIG. 8 shows SSB indication employing starting point and its associated segment-wise bitmap.

FIG. 8 shows an example diagram for an SSB indication employing a hybrid starting point with segment-wise bitmap method. As shown, SSB groups starting points are indicated by 810 and contain N SSBs 820 in each group. A bit 830 may correspond to each SSB 820 within a SSB group. As shown, the total number of SSBs is represented by L.

According to another method, SSB groupings may be used to indicate used and unused SSBs. SSBs may be grouped such that each group may have $N_{SS\_grp,i}$ SSBs for a group i. The grouping may include equal size or unequal size grouping. After the grouping, the resulting number of SS groups may be denoted as $L_{SS\_group}$ where $L_{SS\_group} \leq L$. A group-bitmap may be used to indicate the $L_{SS\_group}$ SSB group and $L_{SS\_group}$ bits may be used for the group-bitmap. For equal sized grouping, the number of SS groups may be determined by $$L_{SS\_group} = \frac{L}{N_{SS\_grp}}$$

As an example, for L=64 and $N_{SS\_grp,i}=4$ for all i, $L_{SS\_group}=16$. Therefore, a total of 16 bits for signaling overhead may be required. SSB grouping may employ localized groupings or distributed groupings.

Figure 9:
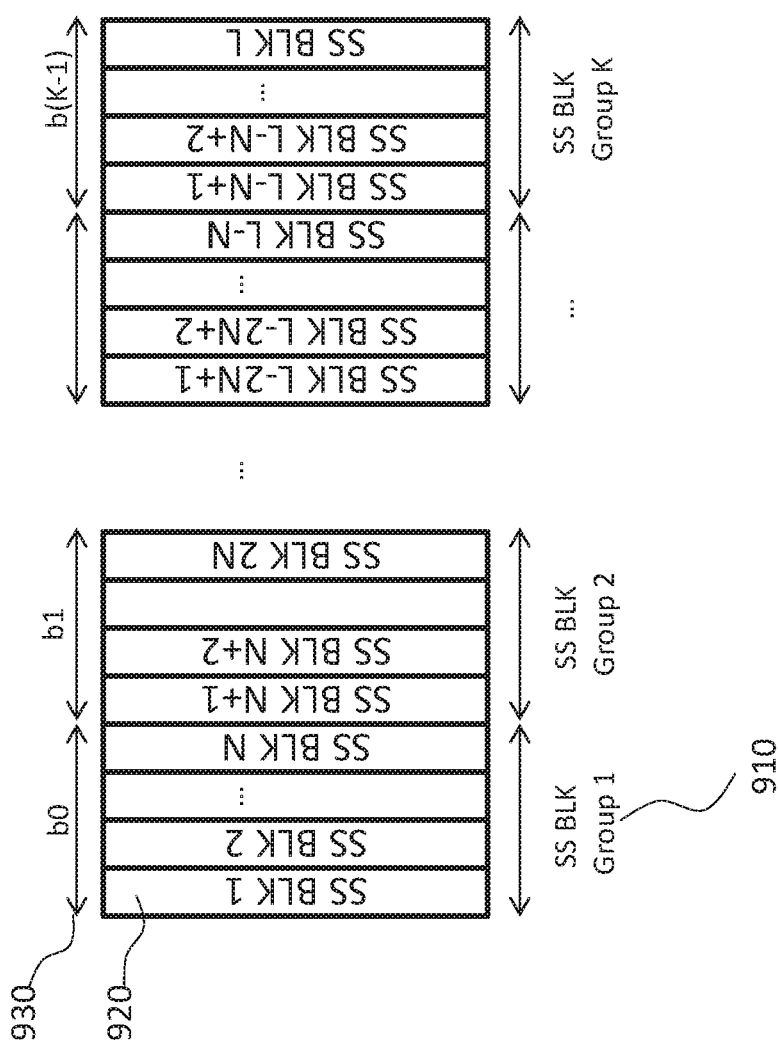
FIG. 9 shows SSB indication employing SSB grouping and reduced bitmap.

FIG. 9 shows SSB indications via SSB grouping and reduced bitmap where the groupings are equal sized. SS bulk groups are indicated by 910 and contain N SSBs 920 in each group. A total of K SS bulk groups 910 are provided. As shown, the total number of SSBs is represented by L. Each of the bits 930 correspond to a group such that the first group 910 is represented by b0 and the last group 910 is represented by b(K−1).

According to another method, multi-level indexing may be used to indicate used and unused SSBs. An SS burst index and SSB index may be used. Two bitmap indicators may be used such that a first bitmap indicator (Group-Bitmap) may correspond to an SS burst index (e.g., an SSB group index) and a second bitmap indicator (Bitmap-in-Group) may correspond to an SSB index. The first bitmap indicator may be used to indicate the used SS bursts and the second bitmap indicator may be used to indicate the used or unused SSBs in the SS bursts that are indicated as used. An SS burst may be a SSB group, or the like. The first bitmap indicator may be used as coarse indicator and the second bitmap indicator may be used as fine indicator, as disclosed herein.

According to another method, an OFDM symbol index may be used to indicate the inactive OFDM symbols within an SSB. The OFDM symbol index may be used to indicate inactive OFDM symbols across all SSBs. The used or unused OFDM symbols may be the same for every SSB. Alternatively, the OFDM symbol index may be used to indicate inactive OFDM symbols for a part of the used SSBs. The number of OFDM symbols per slot or subframe may be different depending on, for example, frequency bands and/or subcarrier spacing (SCS). For example, for a SCS of 15 KHz, 14 OFDM symbols per 2-slot (or 7 OFDM symbols per slot) may be present. For a SCS of 30 KHz, 28 OFDM symbols per 2-slot (or 14 OFDM symbols per slot) may be present. For a SCS of 120 KHz: 112 OFDM symbols per 2-slot (or 56 OFDM symbols per slot) may be present. For a SCS of 240 KHz, 224 OFDM symbols per 2-slot (or 112 OFDM symbols per slot) may be present.

An indication of SSB measurement time window and duration may be provided such that used SSBs may be utilized for measurement purpose. A time location of a used SSB may be provided and may facilitate the measurement for serving cells as well as neighbor cells. For example, a WTRU may receive the time location of used SSBs and may facilitate the measurement for serving cell and neighbor cells. Additionally, unused SSB may also be utilized for measurement purpose. For example, a WTRU may be receive the time location of unused SSBs and may use the time location of the unused SSBs to facilitate measurements such as, for example, interference measurements or signal strengths from neighbor cells.

A WTRU or other applicable device may receive a set of parameters for used and/or unused SSBs. The parameters may include, but are not limited to one or more measurement windows, timing parameters, duration parameters, offset and/or periodicity. The parameters may be provided via one or more indicators.

In an idle mode, a set of parameters for used and/or unused SSBs may be received or provided via NR-PBCH, via remaining minimum system information, and/or via other system information.

In a radio resource control (RRC) connected mode, a set of parameters for used and/or unused SSBs may be signaled via RRC signaling, MAC or MAC CE, and/or physical layer signaling such as NR-PDCCH or NR-ePDCCH.

According to methods disclosed herein, SSBs may be reused. As disclosed herein, SSBs can be used for transmitting synchronization signals and channels. To more efficiently utilize SSBs, other signals or channels may reuse a subset of SSBs to improve system throughput, reduce overhead and enhance spectrum efficiency. SSBs may be reused for other signals or channel transmissions such as, for example, for control and/or data transmission and reception, for CSI-RS transmission such as that performed using TDM, FDM, or hybrid methods, and/or for paging downlink control information (DCI).

Additionally, SSBs may be reused for control channel transmissions. For example, SSBs may be reused for control signaling to enable URLLC transmission, NR-PDCCH, NR-ePDCCH, paging signal or paging DCI, control channel for URLLC, NR-PUCCH, and/or scheduling requests (SR).

Additionally, SSBs may be reused for data channel transmission. For example, SSBs may be reused for URLLC transmission or mini-slot transmission such as for paging channels, paging PDSCH, and/or URLLC data channel.

Additionally, SSBs may be reused for reference signal transmission. For example, SSBs may be reused for CSI-RS transmission such as for channel state information reference signals (CSI-RS), and/or sound reference signals (SRS).

Unused SSBs may allow for the resources reserved for SSBs to be reused for other signal or channel transmissions, as described herein. Additionally or alternatively, a set or subset of SSBs may be transmitted but may not be used for initial access or synchronization purposes. Such set or subset of SSBs may be transmitted to support other procedures such as, for example, beam management. For DL beam management SSBs may be used to enable P-1, P-2 and P-3 procedures.

Further, in idle mode, used and/or unused SSBs may be signaled. The SSBs may be signaled via, for example, NR-PBCH where bits representing unused SSBs may be carried in a NR-PBCH payload. Alternatively or in addition, the SSBs may be signaled via remaining minimum system information where bits representing unused SSBs may be carried in remaining minimum system information that can be scheduled by NR-PBCH. Alternatively or in addition, SSBs may be signaled via other system information where bits representing unused SSBs may be carried in other system information that can be scheduled by the remaining minimum system information.

In RRC connected mode, used and/or unused SSBs may be signaled via, for example, RRC signaling, MAC or MAC CE, and/or physical layer signaling such as NR-PDCCH or NR-ePDCCH.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for a user equipment, the method comprising:
   determining an operational frequency band;
   determining a value L corresponding to the operational frequency band, the value L indicating a maximum number of synchronization signal blocks (SSBs) in a synchronization signal (SS) burst;
   on a condition that the value L is less than a threshold L value, determining a synchronization signal block (SSB) index based on a Physical Broadcast Channel (PBCH) demodulation reference signal (DMRS) sequence;
   on a condition that the value L is 64, determining the SSB index using both of:
   the PBCH DMRS sequence, and
   a PBCH payload;
   receiving a multi-level two stage compressed indication;
   determining a configuration of actually transmitted SSBs using the multi-level two stage compressed indication; and
   receiving one or more actually transmitted SSBs based on the determined configuration of the transmitted SSBs,
   wherein, on the condition that the value L is 64, the SSB index consists of least significant bits (LSBs) and most significant bits (MSBs),
   wherein the LSBs for the SSB index is determined based on the PBCH DMRS sequence, and
   wherein the MSBs for the SSB index is determined based on the PBCH payload.

2. The method of claim 1, wherein the multi-level two stage compressed indication comprises:
   receiving a coarse indicator;
   determining actually transmitted SSB groups based on the coarse indicator;
   receiving a fine indicator; and
   determining actually transmitted SSBs within the SSB groups based on the fine indicator.

3. The method of claim 1, wherein the operational frequency band is determined based on a WTRU configuration.

4. The method of claim 3, wherein WTRU is a handheld device.

5. The method of claim 1, further comprising determining a half radio frame (HRF) indicator from at least one of the PBCH DMRS Sequence and the PBCH Payload.

6. The method of claim 1, wherein determining the SSB index based on the PBCH DMRS sequence comprises detecting SSB index bits based on a signal energy level exceeding a threshold energy level.

7. The method of claim 1, further comprising determining an unused SSB.

8. The method of claim 1, wherein determining the SSB index based on the PBCH DMRS sequence comprises using scrambling.

9. A wireless transmit/receive unit (WTRU) comprising:
a receiver configured to receive one or more synchronization signal blocks (SSBs); and
a processor configured to:
determine an operational frequency band,
determine a value L corresponding to the operational frequency band, the value L indicating a maximum number of SSBs in a synchronization signal (SS) burst,
on a condition that the value L is less than a threshold L value, determine an SSB index based on a Physical Broadcast Channel (PBCH) demodulation reference signal (DMRS) sequence, and
on a condition that the value L is 64, determine the SSB index using both of:
the PBCH DMRS sequence, and
a PBCH payload;
receive a multi-level two stage compressed indication;
determine a configuration of actually transmitted SSBs using the multi-level two stage compressed indication; and
receive one or more actually transmitted SSBs based on the determined configuration of the transmitted SSBs,
wherein, on the condition that the value L is 64, the SSB index consists of least significant bits (LSBs) and most significant bits (MSBs),
wherein the LSBs for the SSB index is determined based on the PBCH DMRS sequence, and
wherein the MSBs for the SSB index is determined based on the PBCH payload.

10. The WTRU of claim 9, wherein the multi-level two stage compressed indication comprises:
receiving a coarse indicator;
determining actually transmitted SSB groups based on the coarse indicator;
receiving a fine indicator; and
determining actually transmitted SSBs within the SSB groups.

11. A method for a base station, the method comprising:
operating the base station in an operational frequency band;
controlling transmission of one or more synchronization signal blocks (SSBs);
transmitting a multi-level two stage compressed indication that is used by a user equipment to determine a configuration of actually transmitted SSBs; and
wherein the operational frequency band corresponds to a value L indicating a maximum number of the SSBs in a synchronization signal (SS) burst;
wherein, on a condition that the value L is less than a threshold L value, an SSB index is determined based on a Physical Broadcast Channel (PBCH) demodulation reference signal (DMRS) sequence,
wherein, on a condition that the value L is 64, the SSB index is determined by using both of the PBCH DMRS sequence and a PBCH payload,
wherein, on the condition that the value L is 64, the SSB index consists of least significant bits (LSBs) and most significant bits (MSBs),
wherein the LSBs for the SSB index is determined based on the PBCH DMRS sequence, and
wherein the MSBs for the SSB index is determined based on the PBCH payload.

12. A base station comprising:
a processor configured to:
operate the base station in an operational frequency band; and
control transmission of one or more synchronization signal blocks (SSBs); and
a transceiver configured to transmit a multi-level two stage compressed indication that is used by a user equipment to determine a configuration of actually transmitted SSBs; and
wherein the operational frequency band corresponds to a value L indicating a maximum number of the SSBs in a synchronization signal (SS) burst;
wherein, on a condition that the value L is less than a threshold L value, an SSB index is determined based on a Physical Broadcast Channel (PBCH) demodulation reference signal (DMRS) sequence,
wherein, on a condition that the value L is 64, the SSB index is determined by using both of the PBCH DMRS sequence and a PBCH payload,
wherein, on the condition that the value L is 64, the SSB index consists of least significant bits (LSBs) and most significant bits (MSBs),
wherein the LSBs for the SSB index is determined based on the PBCH DMRS sequence, and
wherein the MSBs for the SSB index is determined based on the PBCH payload.

* * * * *